United States Patent [19]

Kokubu et al.

[11] Patent Number: 5,282,912
[45] Date of Patent: Feb. 1, 1994

[54] METHOD FOR APPLYING BEAD FLIPPER

[75] Inventors: Satoru Kokubu, Fukushima; Susumu Itou, Shirakawa; Susumu Suga, Fukushima; Kazuo Satou, Kobe, all of Japan

[73] Assignee: Sumitomo Rubber Industries, Ltd., Kobe, Japan

[21] Appl. No.: 817,635

[22] Filed: Jan. 7, 1992

Related U.S. Application Data

[60] Division of Ser. No. 566,893, Aug. 14, 1990, Pat. No. 5,108,538, which is a continuation of Ser. No. 256,963, Oct. 13, 1988, abandoned.

[30] Foreign Application Priority Data

Oct. 16, 1987 [JP] Japan .................. 62-262265

[51] Int. Cl.$^5$ .............................................. B29D 30/50
[52] U.S. Cl. .................... 156/136; 156/130.7; 156/460
[58] Field of Search ............. 156/131, 132, 135, 136, 156/157, 159, 398, 400, 401, 402, 422, 460, 203, 200

[56] References Cited

U.S. PATENT DOCUMENTS

| | | |
|---|---|---|
| 1,553,514 | 9/1925 | Denmire . |
| 1,944,768 | 1/1934 | Stevens .................... 156/422 X |
| 3,185,607 | 5/1965 | Nebout ...................... 156/460 X |
| 3,962,020 | 6/1976 | Yonekawa et al. . |
| 4,196,036 | 4/1980 | Allen et al. . |

FOREIGN PATENT DOCUMENTS 0196521 10/1986 European Pat. Off. .
52-36783 9/1977 Japan .

Primary Examiner—Geoffrey L. Knable

[57] ABSTRACT

A methods and an apparatus for applying the belt-shaped bead filler on the bead core with apex. The method comprises the the steps of: rotating a bead core with an apex together with a belt-shaped bead filler; mounting the bead filler on the internal circumferential surface in an approximately cylindrical shape so as to form an overlapping portion; joining at least a part of the overlapping portion; folding up the cylindrical bead filler on both sides of apex and bead core and press-fitting so as to unify them. The apparatus comprises bead supporting means for supporting rotatably a bead core with an apex, bead filler guide means having a movable table to mount a starting edge of the bead filler against the internal circumferential surface of the bead core, bead filler cutting means for cutting the bead filler, bead rotating means for rotating the bead core with the bead filler, bead filler joining means for joining at least a part of overlapping portions, bead filler folding-up means for folding up the bead filler and bead filler press-fitting means for adhering the bead filler to the both side faces of the apex and bead core. Thereby, since the belt-type bead filler is folded up after being formed in the shape of cylindrical and the overlapping portion being jointed on both sides of the bead core, it hence becomes possible to enhance the quality of tire by preventing the formation of staggered joint and wrinkles.

1 Claim, 14 Drawing Sheets

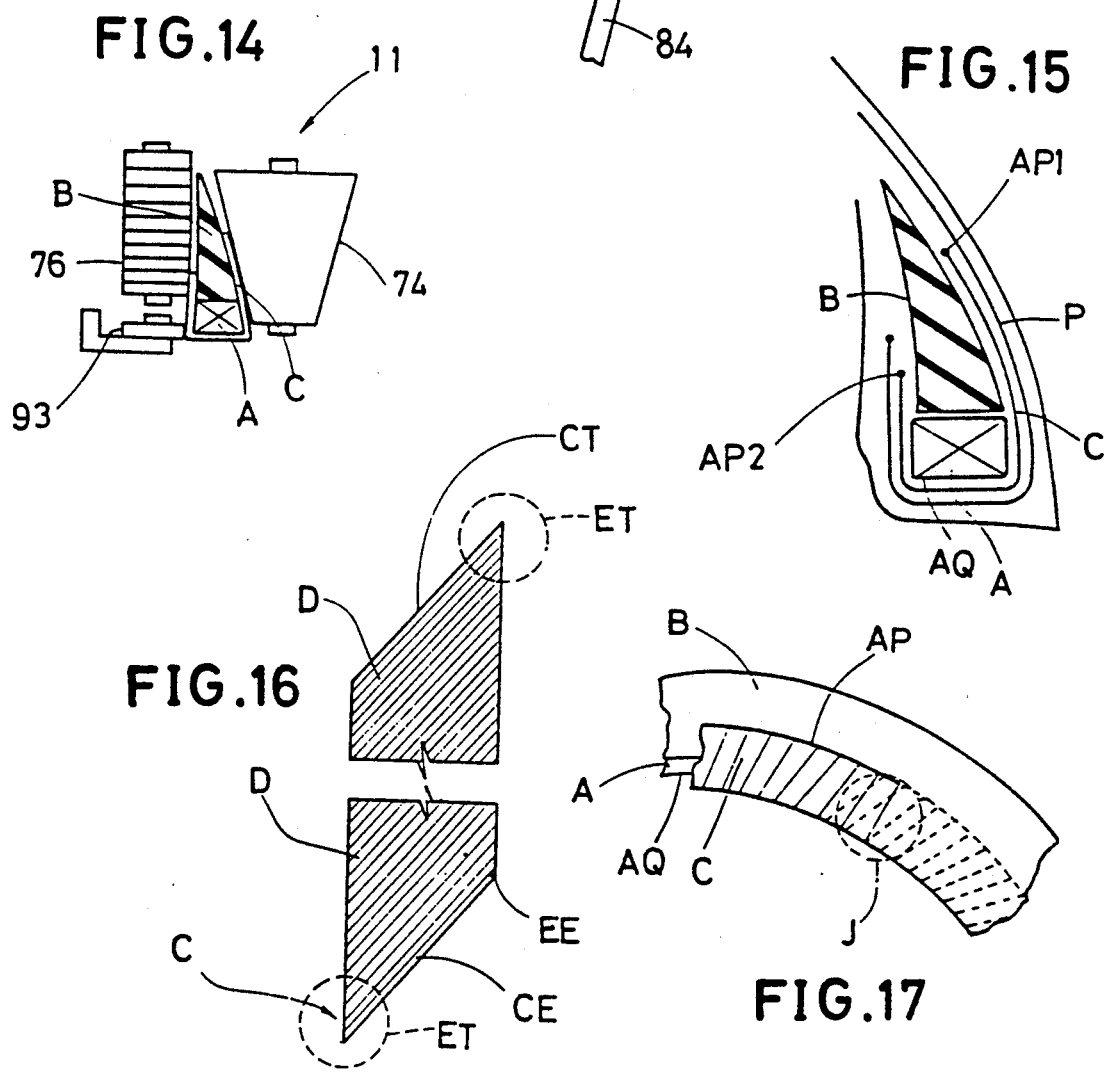

METHOD FOR APPLYING BEAD FLIPPER

This application is a divisional of copending application Ser. No. 07/566,893, filed on Aug. 14, 1990, now U.S. Pat. No. 5,108,538, which is a continuation of copending application Ser. No. 07/256,963, filed Oct. 13, 1988, now abandoned. The entire contents of which are hereby incorporated by reference.

BACKGROUND OF THE INVENTION

The present invention relates to a method and an apparatus for applying a belt-shaped bead filler or flipper on a bead core with apex, in which the bead filler cords, at the overlapping joint portion thereof, are prevented from being disturbed in the arrangement angles so as not to cause staggered joint and wrinkle.

As schematically shown in FIG. 15, at the tire bead equipped with an annular bead core A, an apex B extending outward in the radial direction is provided and also a bead filler C forming a reinforcing layer by folding up from an internal circumferential surface AQ of the bead core A toward both side faces of the apex B is provided inside of at least one layer of a carcass P.

For such a bead filler C, as shown roughly in FIG. 16, generally used is a belt-shaped sheet body having filler cords D composed of organic fibers such as nylon, or inorganic fibers such as steel arranged parallel with a specified inclination (for example, 45 degrees) to the longitudinal direction and covered with raw rubber.

Meanwhile, certain apparatuses for applying such a bead filler C around on the bead core A were proposed, for example, in Japanese Patent Publication No. 52-36783 and Japanese Laid-Open No. 59-209844. In such conventional apparatuses, however, a starting edge CT of the bead filler C is attached to the internal circumferential surface AQ of the bead core A and then the bead filler is folded up around the bead core A outward in the radial direction gradually from the starting edge CT according to the rotation of the bead core A.

But in such a construction the bead filler C was gradually folded up along the bead core A at the same time the bead filler C was being fed to the internal circumferential surface AQ of the bead core A, and since the starting edge CT which was the starting portion for folding up the bead filler C and the terminating edge CE which was the end portion of folding were so-called free ends which tended to deform easily, deformation in folding-up was caused, especially at a knife tip portion ET which became a sharp triangular shape generated at an edge because of a slant cutting along a filler cord D (shown in FIG. 16), to fold up the filler cord D, as shown by a solid line in a circled part in FIG. 17, at a larger angle in the radial direction than the original cord angle (for example, 45 degrees). While at an obtuse triangular portion EE on the other edge, the change of cord angles was scarcely generated as shown by broken lines in FIG. 17.

As a result, at the joint overlapping portion J where the knife tip portion ET of the starting edge CT was superposed on the obtuse triangular portion EE of the terminating edge CE, owing to the standing-up of the cord at the knife tip portion ET, mismatching of cord angles occurred and the filler cords D crossed each other so as to generate a so-called staggered joint (an offset at the joint, shown in the circle in FIG. 17). Accordingly, a tire with a uniform internal structure cannot be produced because of formation of wrinkles at the portion and adverse effects were exerted on the quality of the tire such as filler cord looseness and deterioration of force variation. The joint stagger moreover became more apparent according to the folding height, that is, the length from the internal circumferential surface AQ to the upper edge AP of the folded part increased.

SUMMARY OF THE INVENTION

It is hence a primary object of the present invention to provide a method and an apparatus for applying a bead filler which are capable of preventing the joint stagger of the bead filler, preventing formation of wrinkles, and thereby enhancing the quality of the tire.

According to the invention relating to a applying method of bead filler, the method comprises the steps of rotating by one revolution a bead core with an apex having the apex preliminarily mounted annularly on an outward surface of an annular bead core in the radial direction together with a belt-shaped bead filler of which starting edge is joined to an internal circumferential surface of the bead core, mounting the bead filler on said internal circumferential surface in an approximately cylindrical shape so as to form an overlapping portion for joint by the starting edge and the terminating edge of the bead filler, uniting to joint at least a part of said overlapping portion, folding up said cylindrical bead filler on both sides of said apex and bead core by rotating coiling said bead core, and pressfitting so as to unify them.

Further, according to the invention relating to a bead filler applying apparatus, the apparatus comprises bead supporting means for supporting rotatably a bead core with an apex preliminarily mounted in an annular shape on an outward surface of the annular bead core in the radial direction by outer circumferential surfaces of a plurality of guide rollers arranged on an approximately identical circumference, bead filler guide means having a movable table capable of reciprocating for guiding and pushing, and thereby mounting a starting edge of the belt-shaped bead filler against the internal circumferential surface of the bead core supported by said bead supporting means, bead filler cutting means having a cutter for cutting said belt-shaped bead filler in a dimension slightly longer than the length of said internal circumferential surface of the bead core, bead rotating means for winding said bead core which is supported by the bead supporting means and on which internal circumferential surface the starting edge of the bead filler is mounted, bead filler joining means for uniting to joint at least a part of overlapping portion between the starting edge and the terminating edge of the bead filler mounted in an approximate cylindrical shape on the internal circumferential surface of the bead core while said bead core is rotated, bead filler folding-up means for folding up said cylindrical bead filler of which overlapping portion is joined on both side faces of said apex and bead core, and bead filler press-fitting means for press-fitting the folded bead filler to the both side faces of the apex and bead core.

Constructed in the above way according to this invention, in folding up the bead filler C outward in the radial direction of the bead core A, the process of preliminarily joining at least the knife tip portion of the overlapping portion for joint causes the filler cords at the overlapped portion to be raised and folded up by keeping uniformly the original cord angles, and hence there is no risk for the occurrence of mismatching of angles between the cords at the starting edge CT and the terminating edge CE at the knife tip portion ET.

BRIEF DESCRIPTION OF THE DRAWINGS

Embodiments of the present invention will now be described in detail by way of example with reference to the drawings, in which:

FIG. 13 is a front view showing the operation of the filler folding-up means;

FIG. 14 is a sectional view showing the operation of the filler press-fitting means;

FIG. 15 is a sectional view of the tire bead area;

FIG. 16 is a plan view schematically showing the bead filler; and

FIG. 17 is a front view schematically showing a staggered joint.

DETAILED DESCRIPTION OF SPECIFIC EMBODIMENTS

The method of the invention is characterized by a step of preliminarily joining at least a part of overlapping portion for joint of a bead filler C before folding up the bead filler C outward in the radial direction of an annular bead core A.

The bead core A is an annular body formed by coiling rubbered steel cords, and its dimension is preset depending on the tire sizes. In addition, on the bead core A, as roughly shown in FIG. 15, a bead apex B having a triangular section becoming narrower outward in the radial direction and composed of hard rubber has been mounted in an annular shape on the entire external circumference of the bead core A in a previous process.

The bead filler C is, in this embodiment, is a belt-shaped sheet body formed by cutting a belt-shaped fabric cloth composed of organic fiber cords such as nylon and kevlar coated with rubber in a specified width in bias, for example, at 45 degrees in regard to the lengthwise direction and by joining a multiplicity of thus obtained cut pieces at their non-cut edges.

Figure 12:
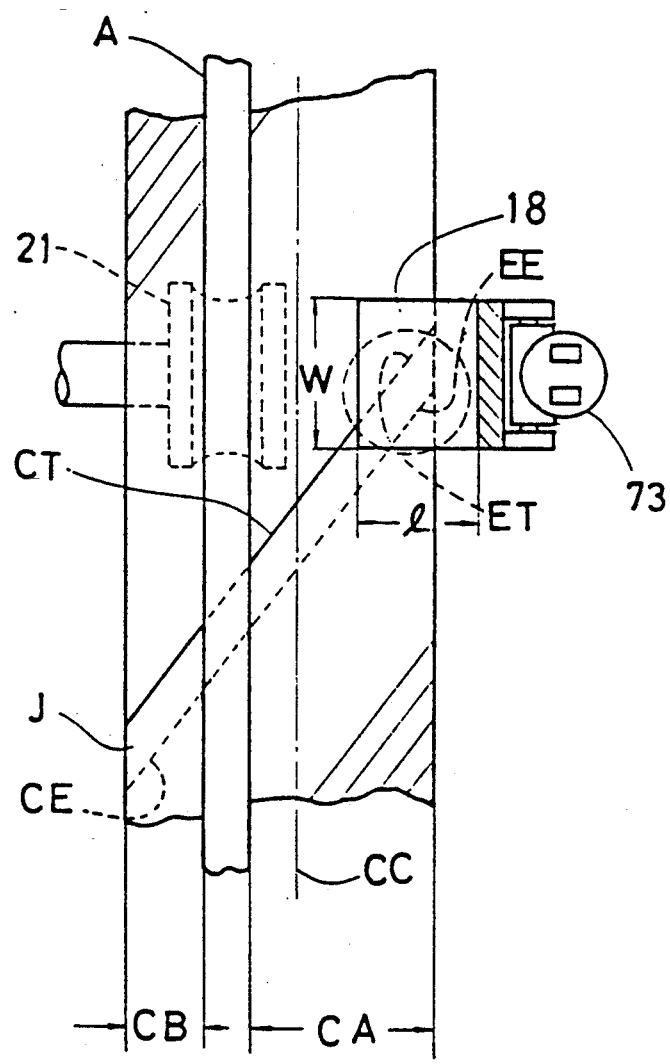
FIG. 12 is a plan view schematically showing the relative position between the overlapping portion of the filler and the filler joining means.

Furthermore in the bead filler C in this embodiment, the center line CC is deviated from the bead core A as shown in FIG. 12 so that an overhanging portion CA should be wider than the other overhanging portion CB. As a result, when the filler C is folded up on the both sides of the bead, as shown in FIG. 15, the heights of folded-up edges AP1 and AP2 of the filler C do not match each other, and a preferable step is formed, which can reduce a sudden change in stiffness. In order to prevent the staggered joint as described above at this portion in this embodiment, the overlapping portion J of the bead filler C is preliminarily joined before folding up at this wider overhanging portion CA.

Figure 10:
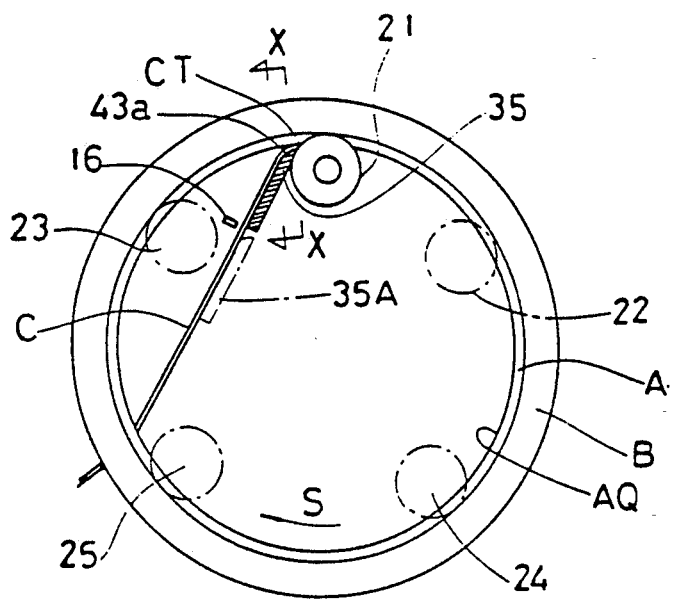
FIG. 10(a) is a front view schematically showing the operation of the filler guide means.
FIG. 10(b) is a sectional view on line X—X in FIG. 10(a) schematically showing the state of pressing the starting edge of the filler against the internal circumferential surface of the bead core.
FIG. 10(c) is a front view schematically showing the cutting position by filler cutting means.
FIG. 10(d) is a sectional view on line Y—Y in FIG. 10(c)
FIG. 10(e) is a perspective view showing a bead filler mounted cylindrically on the bead core with a bead apex.
FIG. 10(f) is a front view showing a completely finished state of the sticking of the bead filler on the bead core.
FIG. 10(g) is a sectional view in the radial direction of FIG. 10(f)
Figure 10:
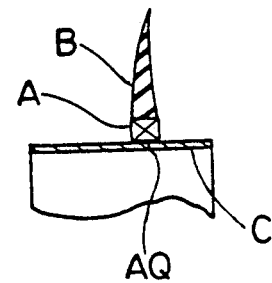
Figure 10:
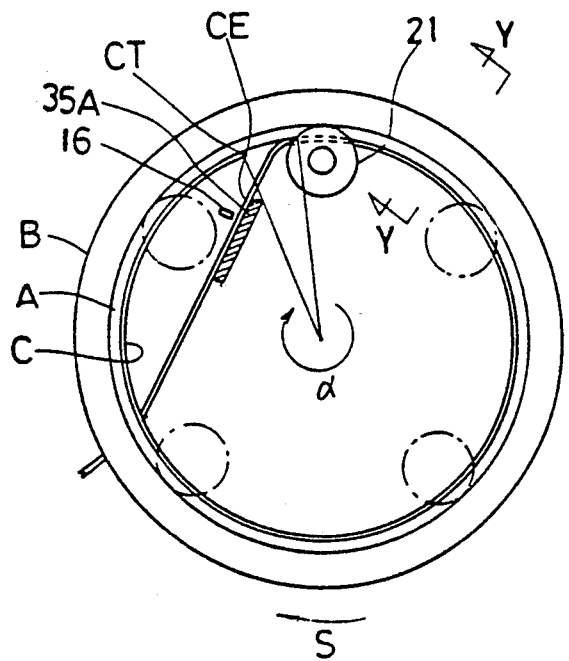
Figure 10:
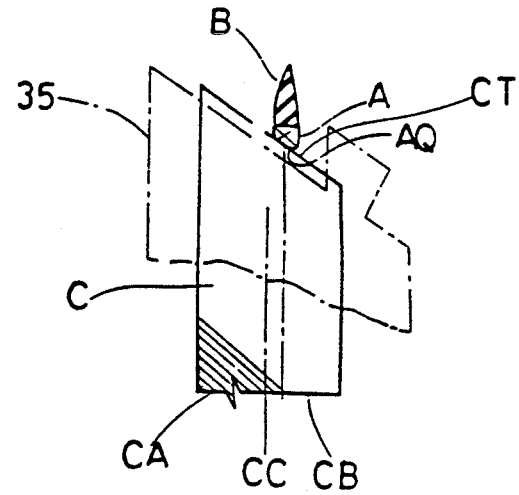
Figure 10E:
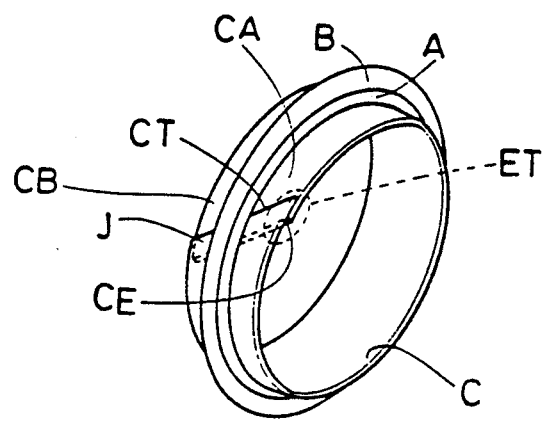
Figure 10F:
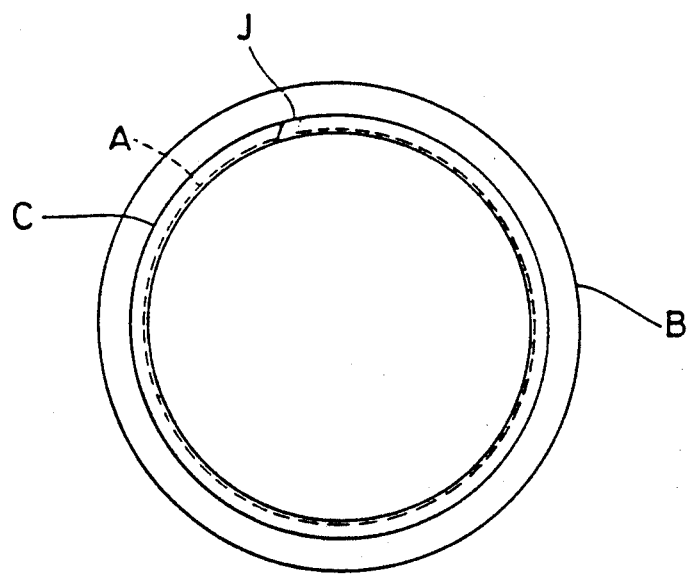
Figure 10G:
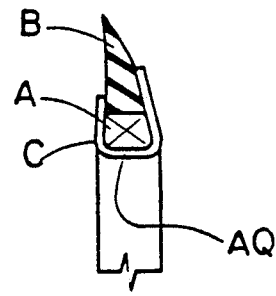

In this invention, the bead core A is rotated in the direction of an arrow S in the state that a starting edge CT of the belt-shaped bead filler C is pressed against an internal circumferential surface AQ of the bead core A with an apex supported rotatably (shown in FIG. 10(a), (b)), and the rotation is stopped when the rotating angle of the starting edge CT of the bead filler C becomes a predetermined angle (α) (shown in FIG. 10(c), (d)). This angle (α) is an angle position where the length of the bead filler C from the starting edge CT to the cutting position by a cutter 16 becomes a dimension slightly longer than the length of the internal circumferential surface AQ of the bead core A, that is, a sum of the length of the internal circumferential surface AQ and the length of the overlapping portion J. The bead filler C is cut in this state to a predetermined dimension obliquely along the filler cord D by the cutter 16, and sequentially the bead filler C is mounted in an approximate cylindrical shape on the internal circumferential surface AQ as shown in FIG. 10(e) by further rotating the bead core A. In this way, the overlapping portion J for joint is formed with the starting edge CT and the terminating edge CE of the bead filler C (shown in FIG. 10(e)). After uniting by press-fitting to joint, for example, the wider overhanging portion CA of the overlapping portion J at a knife tip portion ET; the bead core A is rotated again for one revolution as shown in FIG. 13, and at this time, the cylindrical bead filler C is folded up outward in the radial direction of the bead core A and simultaneously press-fitted and unified to both side faces of the bead core A and the bead apex B, and thereby the bead filler is completely applied and adhered to the bead (shown in FIGS. 10(f), (g) and FIG. 14). In this process, it is also possible to join the overlapping portion j of the cylindrical bead filler C not only at the knife tip part ET but also the whole portion of the overlapping portion.

Consequently, when folding up the bead filler C outward in the radial direction of the bead core A, the overlapping portion J for joint, especially the knife-tip portion ET is preliminarily joined, so that the filler cords D at the overlapping part J are folded up while keeping the original cord angle uniformly, and there is hence no possibility of inducing mismatching of angles between the cords at the starting edge CT and the terminating edge CE at the knife tip portion ET.

Figure 1A:
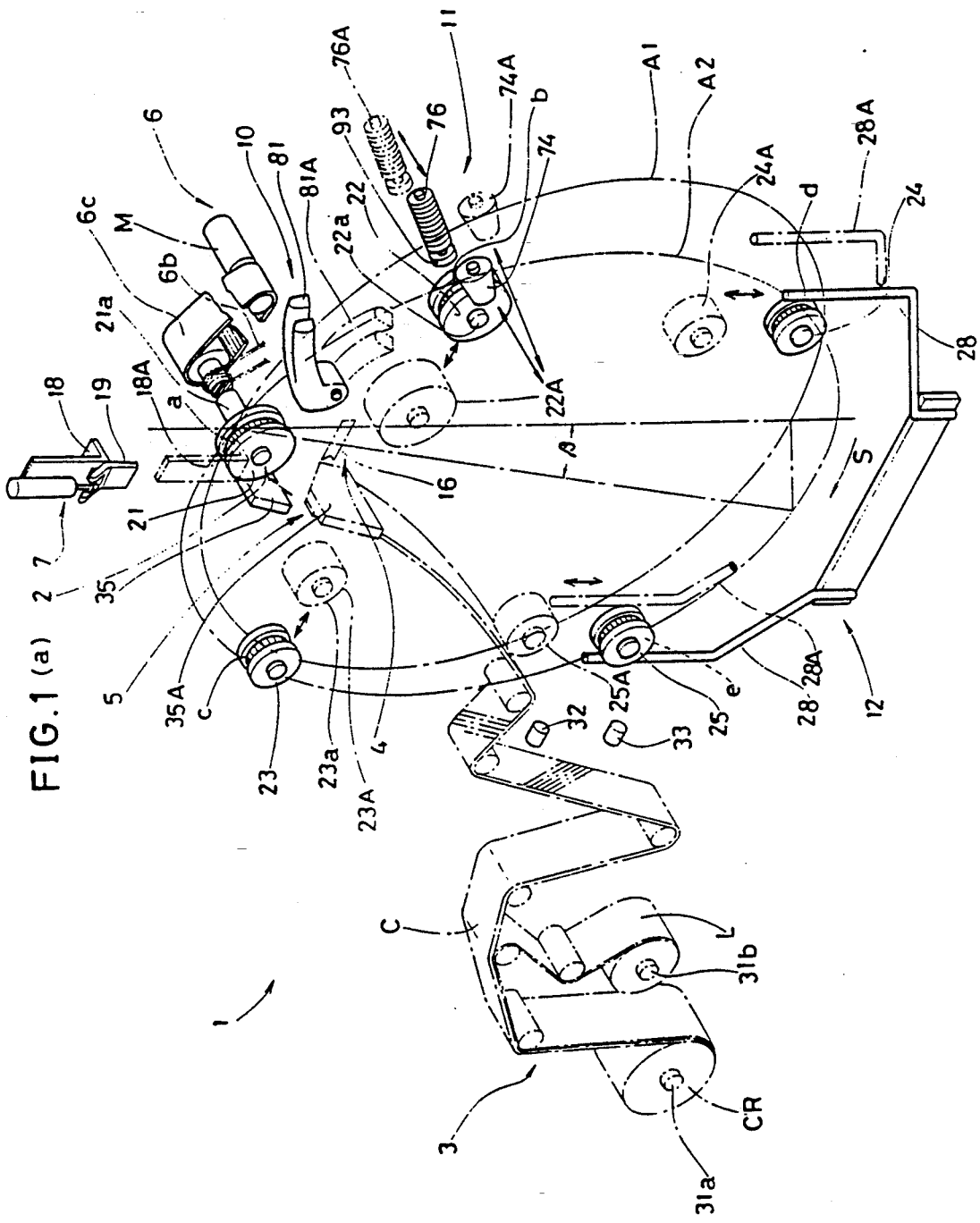
FIG. 1(a) is a perspective view schematically showing an embodiment of this invention only by its principal parts.
Figure 1:
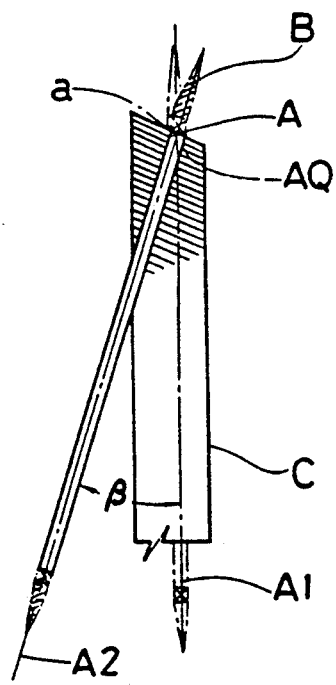
FIG. 1(b) is a sectional view showing the relation of position and inclination between the bead core and bead filler.
Figure 2:
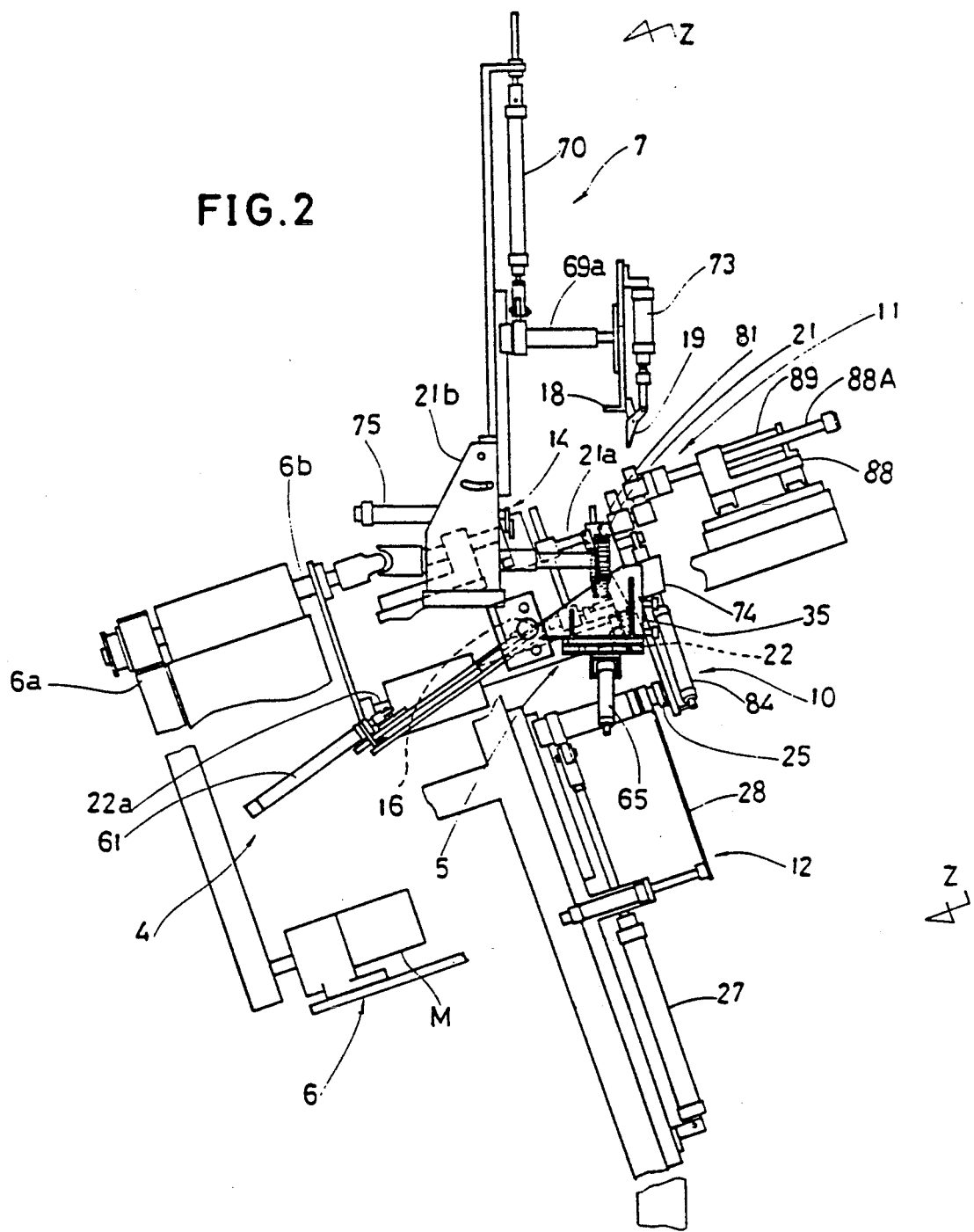
FIG. 2 is a schematic side elevation showing principal parts of the apparatus.
Figure 3:
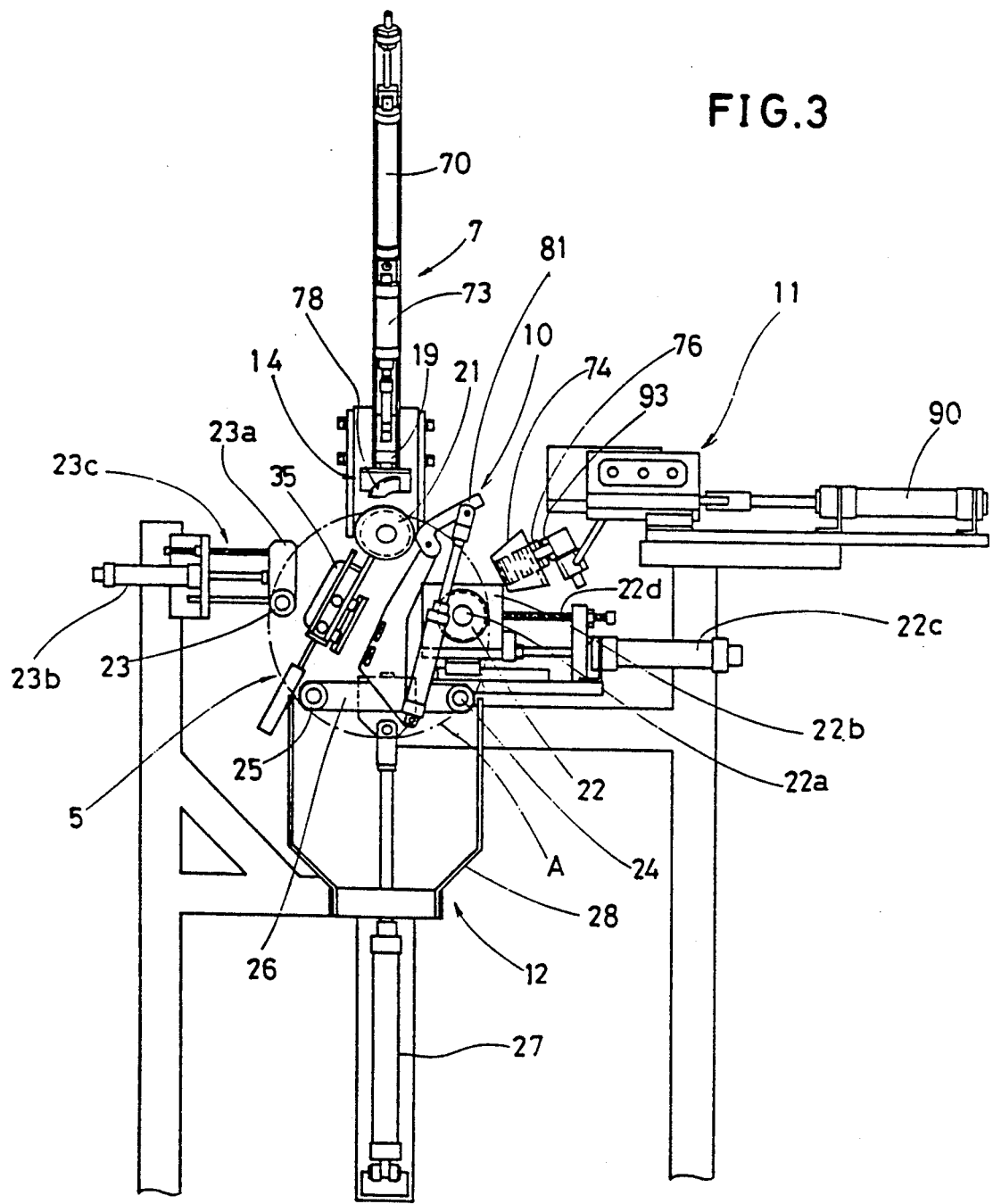
FIG. 3 is an arrow view on line Z—Z in FIG. 2.

Another embodiment relates to an apparatus used in executing the method invention, which is shown in FIG. 1(a) where a frame of the apparatus is omitted and the configuration of the parts is preliminarily shown and roughly illustrating guide rollers 21 to 25 of bead supporting means 2, filler feeding means 3, a cutter 16 of filler cutting means 4, a movable table 35 of bead filler guide means 5, bead rotating means 6, a receiving piece 18 and a turning piece 19 of filler joining means 7, a folding-up shaft of filler folding-up means 10, a cone roller 74 and a disc multiple-stage roller 76 of filler press-fitting means 11, and a main shaft 28 of bead positioning means 12. FIGS. 2 and 3 are a schematic front view and a left side elevation respectively, which are drawn simplifying part of means such as frame for the sake of simplicity of illustration.

Figure 11:
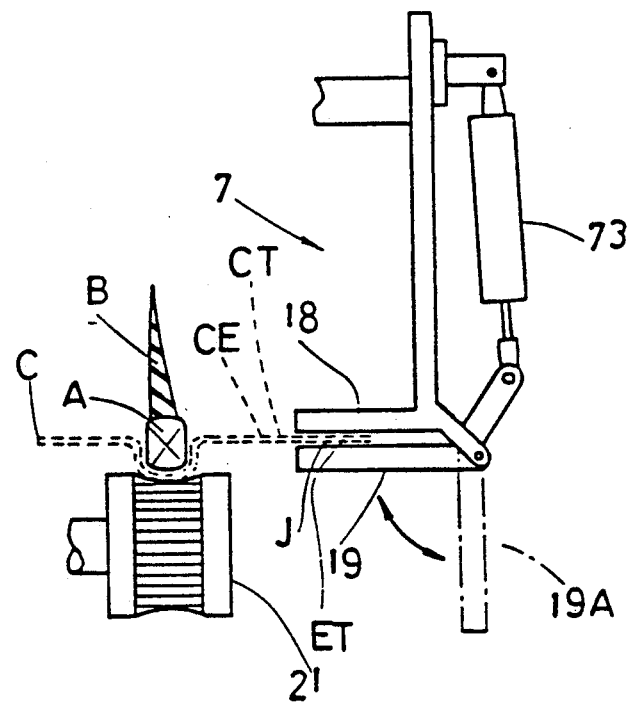
FIG. 11 is a front view schematically showing the filler joining means.

In FIGS. 1 to 8, bead filler applying apparatus 1 comprises bead supporting means 2 for supporting an annular bead core A, bead filler feeding means 3 for feeding a bead filler C, bead filler cutting means 4 for cutting the fed bead filler C, bead filler guide means 5 for guiding a starting edge CT of the bead filler C toward the bead core A and mounting it on the internal circumferential surface of the bead core A, bead rotating means 6 for rotating the bead core A, bead filler joining means 7 for joining an overlapping portion J formed as a result of rotation of the starting edge CT and a terminating edge CE of the bead filler C (shown in FIG. 10(e), FIGS. 11 and 12), bead filler folding-up means 10 for folding up the bead filler C outward in the radial direction of the bead core A, and bead filler press-fitting means 11 for press-fitting the folded bead filler C to be a bead apex B and the bead core A, and this apparatus may be furthermore equipped with bead positioning means 12 for determining the position in mounting the bead core.

The bead filler C is formed by arranging relatively short cords in parallel and obliquely to the lengthwise direction and by covering with raw rubber, and it is hence easily deformed and likely to cause cord disturbance. Accordingly it is handled so as not to receive external force (stress) as far as possible in feeding or guiding process.

As a result, in the apparatus 1, as shown in FIGS. 1(a), (b) the bead filler C is fed and guided by the filler feeding means 3 and the filler guide means 5 while its center line passes through a perpendicular plane, and on the other hand, the bead core A is supported by the bead supporting means 2 so that a plane containing the bead core A should be maintained on a plane A2 which is inclined from a virtual plane A1 at an angle of ($\beta$) forward at the bottom having a peak point a which is common with the top point of the bead filler C so as not to interfere with the bead filler C fed in a perpendicular plane toward the internal circumferential surface AQ.

The bead supporting means 2 comprises first to fifth guide rollers 21, 22, 23, 24 and 25, and the first and second guide rollers 21, 22 are composed of identical grooved rollers having a small groove in the axial direction to prevent the bead core A from slipping. The first guide roller 21 (shown in FIG. 4 in details) is furthermore kept so as to be capable of supporting the bead core A at the peak point a and so that its supporting shaft 21a becomes horizontal to the frame, that is, perpendicular to the plane A1. The second guide roller 22 supports the bead core A at a point b separated by approximately 70 degree in rightwise direction in the drawing, that is, a turning direction of the bead core shown by an arrow S from the peak point a and its supporting shaft 22a crosses with the plane A2 at right angles.

The first guide roller 21 is, as shown in FIG. 1(a), linked at its supporting shaft 21a to the bead rotating means 6 composed of rotating machine M such as a reduction motor through transmission means 6a such a timing belt, and a universal coupling, and others. As a result, the bead rotating means 6 can drive the first guide roller intermittently in the direction shown by the arrow S, and the bead rotating means 6 is moreover linked to a supporting shaft 22a of the second guide roller 22 through transmission means 6b.

The third guide roller 23 is in a grooved cylindrical shape, which supports the bead core by its groove at a position c approximately 70 degrees from the peak point a to the left in the drawing, that is, in the anti-rotation direction.

The second and third guide rollers 22 and 23 are, as shown in FIG. 3, pivoted by bearing frames 22b and 23a, which can reciprocate, by cylinders 22c, 23b linked to the bearing frames 22b and 23a, from the operating position supporting the bead core A at the positions b and c to inner escaping positions 22A, 23A, shown by a chain line in FIG. 1(a). On the cylinders 22c, 23b, positioning levers 22d, 23c for maintaining at the operating positions b, c are furnished.

The fourth and fifth guide rollers 24, 25 are grooved cylindrical rollers in approximately the same shape as the third guide roller 23, which can support the bead core A rotatably by their grooves at positions d and e approximately 140 degrees leftward and rightward from the peak point a.

Figure 5:
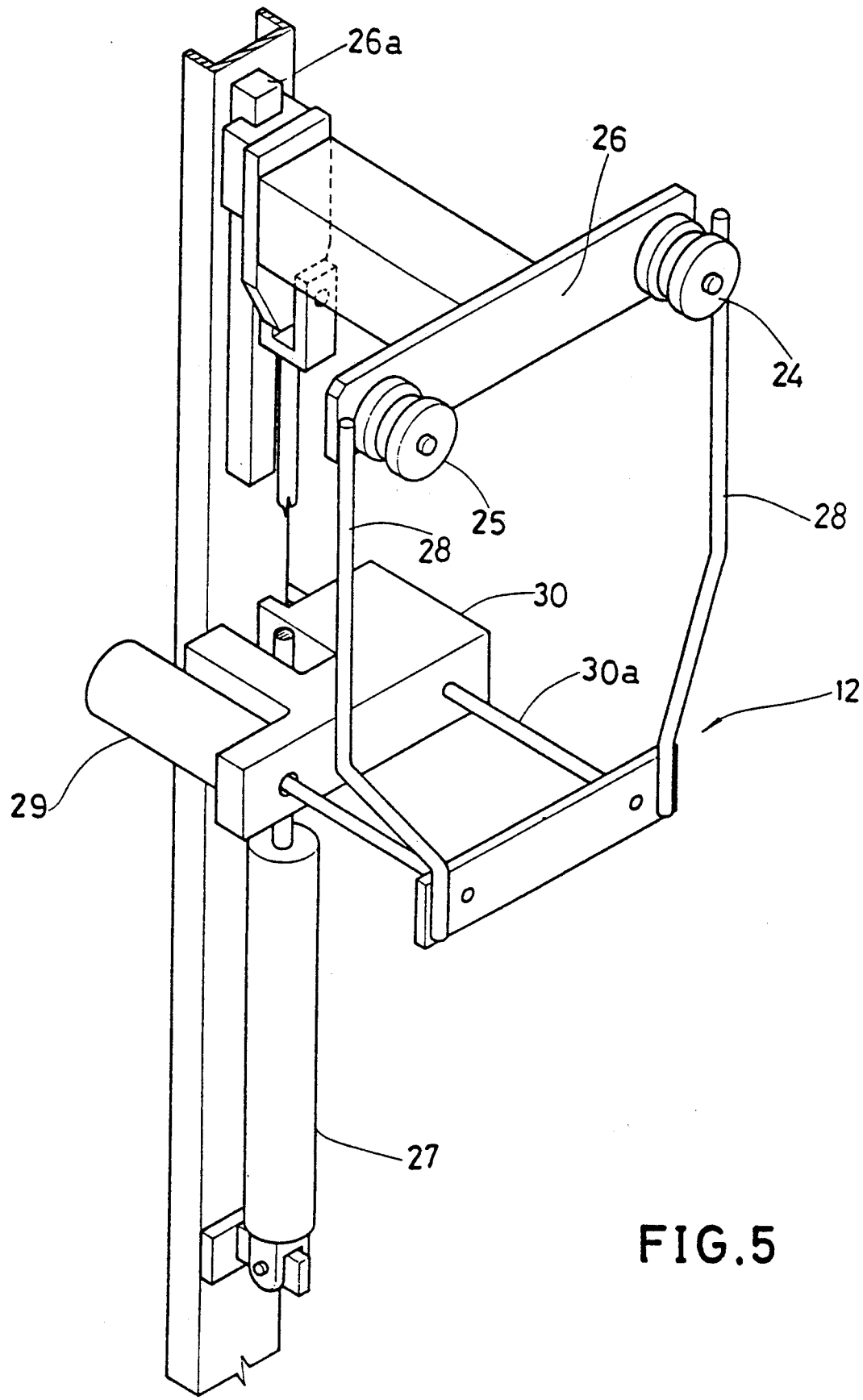
FIG. 5 is a perspective view showing an example of the fourth and fifth guide rollers and the bead positioning means.

The fourth and fifth guide rollers 24 and 25 are, as shown in FIG. 5, pivoted freely rotatably at both edges of a coupling shaft 26, and the coupling shaft 26 is mounted on a perpendicular guide 26a furnished on a vertical member of the frame through a joint shaft and a linear bearing, and also linked to a cylinder 27 supported at the lower part of the vertical member so that it can rise up to escaping positions 24A, 25A shown by a chain line in FIG. 1(a).

The movement of the second to fifth guide rollers 22 to 25 up to the escaping positions 22A to 25A as described above causes the bead core A to be mounted on the groove of the first guide roller 21 without interfering with the rollers 22 to 25 in a preparatory stage in the sticking process of the bead filler C, and the recovery to the operating positions causes the bead core A to be supported on the plane A2 while keeping a complete circle at the positions equally divided into five, and it also causes the bead positioning means 12 to hold the lower part of the bead core A in mounting the bead core A.

The bead positioning means 12 is, as shown in details in FIG. 5, designed so that a pair of supporting shafts 28 standing up outside the fourth and the fifth guide rollers 24, 25 are vertically fixed to a moving plate at the upper part, and that the moving plate is linked to a cylinder 29 mounted at the back of a base frame 30 fixed on the vertical member of the frame, and the supporting shaft, hence holds the lower part of bead core A at the plane A2 by the action of the cylinder 29, and also withdraws the supporting shafts 28 to the escaping position 28A by the contraction of the cylinder 29 when the bead core A is supported by the guide rollers 21 to 25. The moving plate 30 has locking guides 30a passing through the base body projected therefrom.

To the internal circumferential surface AQ of the bead core A, the bead filler C is fed and guided near the first guide roller 21 by using the filler feeding means 3 and filler guide means 5.

The filler feeding means 3 comprises, as shown in FIG. 1(a), a supporting shaft 31a for supporting a bead filler roll CR, a supporting shaft 31b for winding a liner L linked to a motor with brake (not shown) for drawing out the liner L together with the filler, and upper and lower photoelectric apparatus 32, 33. The motor with brake drives the drawing shaft 31b so that the sagging length of the bead filler C formed in front of the apparatus 1 should be in the height ranges of the photoelectric apparatus 32, 33, which makes it possible to prevent unnecessary external force (stress) from being applied on the bead filler C to be applied on the bead core A.

Figure 6:
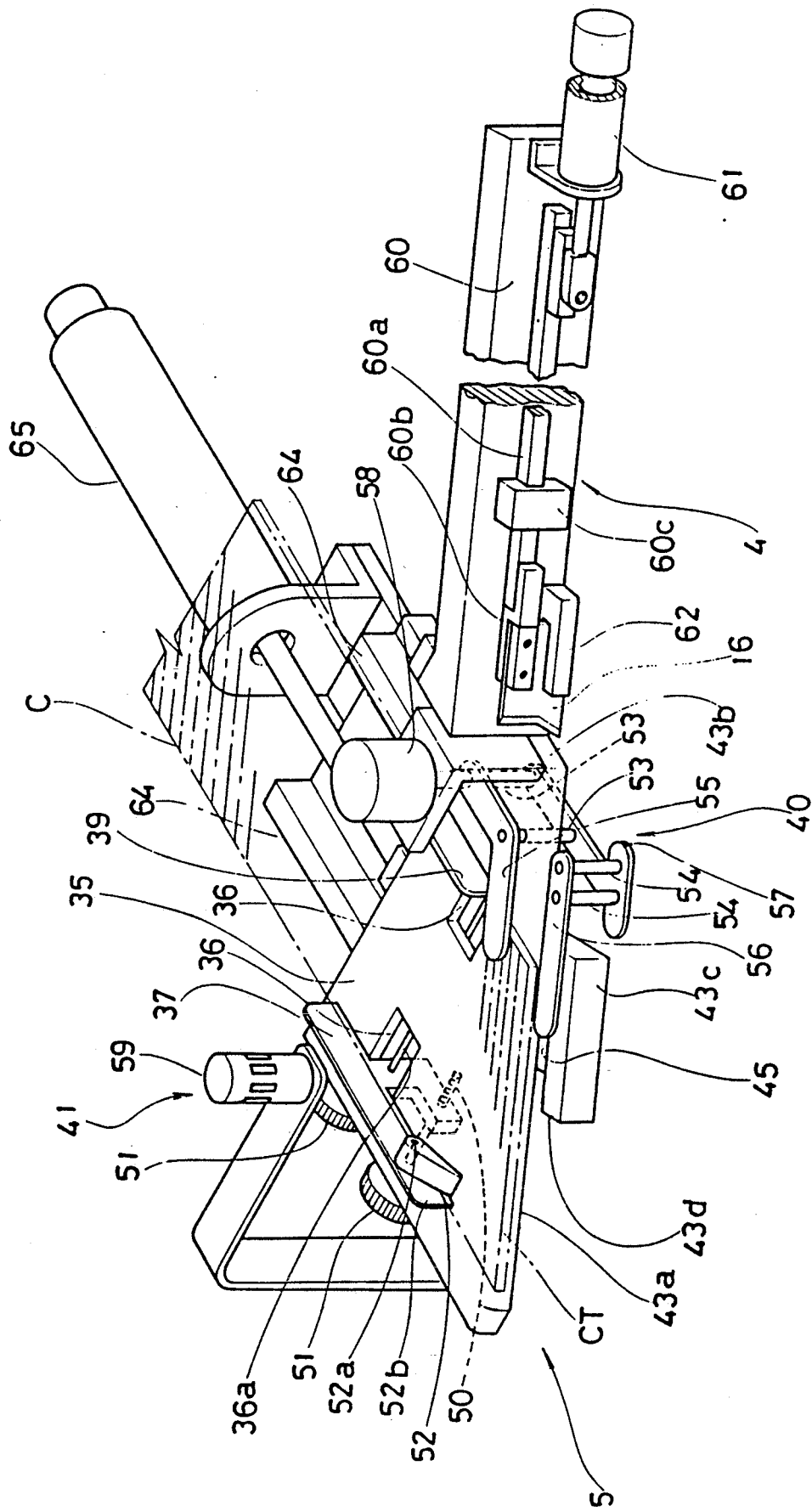
FIG. 6 is a perspective view showing an example of filler guide means and filler cutting means.

The bead filler guide means 5 is furnished with a movable table 35 reciprocating near the first guide roller 21 up and down somewhat obliquely toward the upstream side in the rotating direction S of the bead core A, and in this embodiment, as shown in FIG. 6, the movable table 35 is equipped with guide plates 37, 39 for controlling the position in the widthwise direction of the bead filler C, filler pressing means for pressing the bead filler C in cutting, and a blowing apparatus 41 for pressing the cut edge of the bead filler C by an air flow, and on the other hand, the filler cutting means 4 is integrally mounted on the movable table 35.

Figure 9:
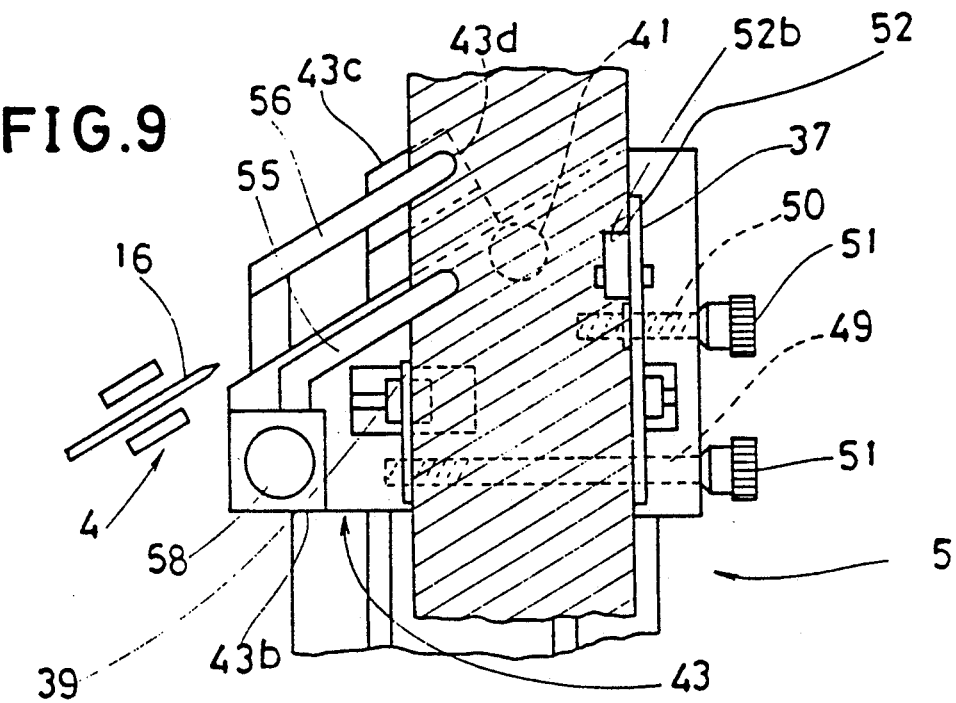
FIG. 9 is a plan view showing the operation of the filler cutting means.

The movable table 35 comprises a pressing part 43a at an angle coinciding with that of filler cords D on the upward edge of a flat plate-shaped base plate 43, a protrusive part 43b on the side part of a shorter side extending from the base plate 43 in the side direction, and a receiving part 43c protruding from the pressing part 43a, which can form a notch groove 45 with the pressing part 43a where a cutter 16 having the identical inclination passes. A side edge 43d of the receiving part 43c on the center side prevents the collision between the receiving part 43c and the bead core A due to the movement of the movable table 35 by deflecting from the position of the movable table 35 approaching near the bead core A by the movement of the movable table 35 to the shorter side part. Rectangular openings 36 are formed nearly on both sides of the center of the movable table, and the guide plates 37, 39 are guided by a guide shaft 36a passing through opening 36. The guide plates 37, 39 are long plates contacting with the upper surface of the movable table 35, and the bead filler C is guided between them. The guide plates 37, 39 are respectively engaged with screw shafts 49, 50 (shown in FIG. 9) which are pivoted on the movable table 35, which can move the guides 37, 39 in the approaching or departing direction by turning handles 51, 51 at one end each of the screw shafts 49, 50, and the interval between the guides is thereby adjusted freely depending on the width and the position of the center line CC of the bead filler C to be guided. In addition, holding means 52 is provided near the upper edge of the guide 37, one of the two, which has a claw 52b for preventing dropout pivoted on a shaft 52a being inclined so that its tip rises upward and contacts with the upper surface of the movable table 35. This claw 52b engages with the bead filler C to prevent slip-off of the bead filler C from the base plate 43 of the movable table 35 by a wedging effect.

In the filler pressing means 40, a pushing piece 55 extending toward the center part of the base plate 43 obliquely at an angle equal to the notch groove 45 through which the cutter passes is mounted on the upper ends of guide shafts 53, 53 supported movably up and down at a right angle to the base plate 43 by the protrusive part 43b, and the lower ends of the guide shafts 53, 53 are linked to each other by a coupling piece 57 at the lower part of the protrusive part 43b, and furthermore, a pushing piece 56 positioned above the receiving part 43 in the same direction as the pushing piece 55 is fixed through joint shafts 54, 54. A cylinder 58 fixed on the protrusive part 43b through a supporting frame is linked to the upper part of the inner guide shaft and its contraction and expansion bring the pushing pieces 55, 56 closer to the base plate 43 of the movable table 35 and the upper surface of the receiving part 43c on the both sides of the notching groove 45 and therefore makes it possible to pinch and fix the bead filler C in cutting.

The blowing apparatus 41 comprises a blower 59 generating an air pressure to such an extent as to push the starting edge CT of the bead filler C against the base plate 43, and the blower 59 has its nozzle directed near the pressing part 43a.

The bead filler cutting tool 4 comprises, for example, a cylinder 61 on a supporting plate 60 fixed on the protrusive part 43b and extending obliquely sideways, a cutter attached to the cylinder 61 through a guide shaft 60a and a fitting 60b and a heater 62 for heating the cutter 16. The tip of the cutter forms an approximate V shape, and the cutter 16 cuts the bead filler C obliquely along its forward and backward movement by moving from one edge to the other of the movable table 35 through the notching groove 45 at an angle coinciding with the filler cords D by the cylinder 61.

The guide shaft 60a is guided while being prevented from turning by a linear bearing 60c. The cutting angle can be adjusted according to the filler cord angle by an appropriate angle adjuster mounted on the cutter 16 not shown in the drawing. The heater 62 heats the cutter 16, for example, to about 100 degrees Cent., which makes it easy to cut the raw rubber of the bead filler.

A linear bearing which slides on rails 64, 64 mounted on the frame is mounted on the movable table 35 in its rear lower surface in the central line direction, and a cylinder 65 mounted on the frame is also linked, so that the movable table 35 can reciprocate by the elongation and contraction of the cylinder 65 from the operating position where the pressing part 43a of the movable table 35 is pressed against the internal circumferential surface AQ of the bead core A and the starting edge CT of the bead filler C is pressed against the bead core A and stuck, down to a waiting position 35A (shown in FIG. 1(a)).

The bead rotating means 6 starts its operation after the filler guide means 5 presses the starting edge CT of the bead filler C to the bead core by the elevation of the movable table and it withdraws to the waiting position 35A. Accordingly, the rotation of the first and second guide rollers 21, 22 can turn the bead core A and mount the bead filler C continuously on the internal circumferential surface AQ of the bead core A. The attachment of the bead filler C causes the entire section to be in an approximate inverted T-shape as shown in FIG. 10(d). When the bead turns by an angle (α) nearly one revolution as shown in FIG. 10(c), where the length from the starting edge CT of the bead filler C to the operating position of the cutter 16 becomes equal to the sum of the length of the internal circumferential surface AQ of the bead core A plus that of the overlapping portion J for joint, the bead rotating means 6 stops and the cutter 16 allocated at the escaping position advances, and the bead filler C is thus cut. The bead rotating means 6 restarts and rotates the bead core A to a degree slightly more than one revolution, and the bead filler C is thereby applied and stuck to the entire internal circumferential surface AQ of the bead core A by making the overlapping portion J. As described above, the bead rotating means 6 can rotate the bead core A intermittently by approximately one revolution and the rotation is controlled by a pulse counter (not shown) of the rotating means 6.

In this way, the bead filler C is mounted almost cylindrically on the internal circumferential surface AQ of the bead core A, as shown in FIG. 10(e) together with the overlapping part J.

Figure 4:
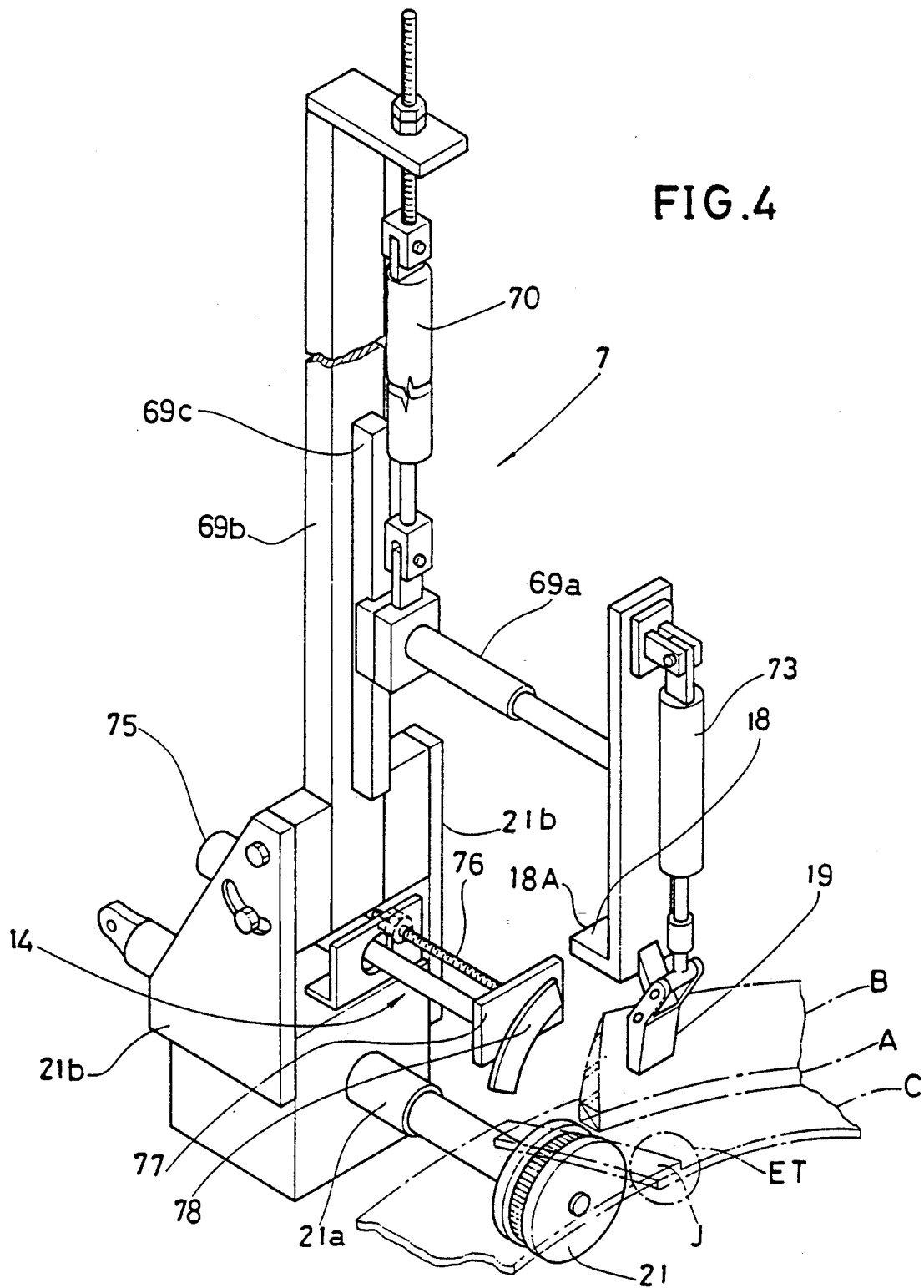
FIG. 4 is a perspective view showing an example of guide rollers and filler joining means.

The filler joining means 7 is located, as shown in FIG. 4, above the first guide roller 21, and it is mounted on receiving pieces 21b, 21b on both sides of a bearing body pivoting a supporting shaft 21a of the roller 21 so as to be capable of adjusting the forward and backward inclining angle. In this embodiment, positioning means 14 of the bead filler is provided above the bearing body.

The filler joining means 7 comprises, as shown in FIG. 4, FIG. 11 and FIG. 12, a receiving piece 18 capable of approaching to or departing from the overlapping portion J for joint of the bead filler C, and a turning piece 19 pivoted on the receiving piece 18. The receiving piece 18 is a folded-over piece at the lower end of the L-shaped frame, and the L-shaped frame is linked to a linear bearing through a joint shaft 69a capable of adjusting its length. The linear bearing can slide on a perpendicular rail 69c in front of a column 69b supported between the receiving piece 21b, and the rod of a cylinder 70 mounted on a protrusion piece at the top of the column 60c by using a screw shaft so as to be capable of adjusting its height is connected to the linear bearing, so that the receiving piece 18 can reciprocate depending on the elongation and contraction of the cylinder 70 from an escaping position 18A above to a position where the press-fitting and joining of the overlapping part J of the bead filler C is required, for example, the position contacting with the upper surface of the knife tip portion ET of the bead filler in this embodiment in the arrow direction. The turning piece 19 is pivoted by a bearing part protruding downward obliquely at the root of the receiving piece 18, and a lever attached to the turning piece 19 is joined to cylinder 73 mounted tiltably by the L-shaped frame. Consequently, the turning piece 19 can turn between the operation position superposed with the receiving piece 18 and a waiting position 19A droping downward, as shown in FIG. 11, by the elongation and contraction of the cylinder 73. At the operating position, the knife tip portion ET of the overlapping portion J is consolidated and joined in this embodiment.

Here, the width W and the depth (l) of the receiving piece 18 and the turning piece 19 are predetermined by the range to join and adhere within the overlapping portion J.

The positioning means 14 is designed to mount a moving plate 77 of which protruding length is controlled by an adjusting shaft 76 on the rod of a cylinder 75 located between the receiving pieces 21b and to guide an edge of the bead filler C transferred from the movable table 35 by an arc-shaped guide piece 78 on the front surface of the moving plate 77.

The filler folding-up means 10 and the filler press-fitting means 11 are, in this embodiment, positioned between the first guide roller 21 and the second guide roller 22 as shown in FIG. 1(a) and FIG. 3, and the filler press-fitting means 11 comprises a cone roller 74 and a disc multistage roller 76.

Figure 7:
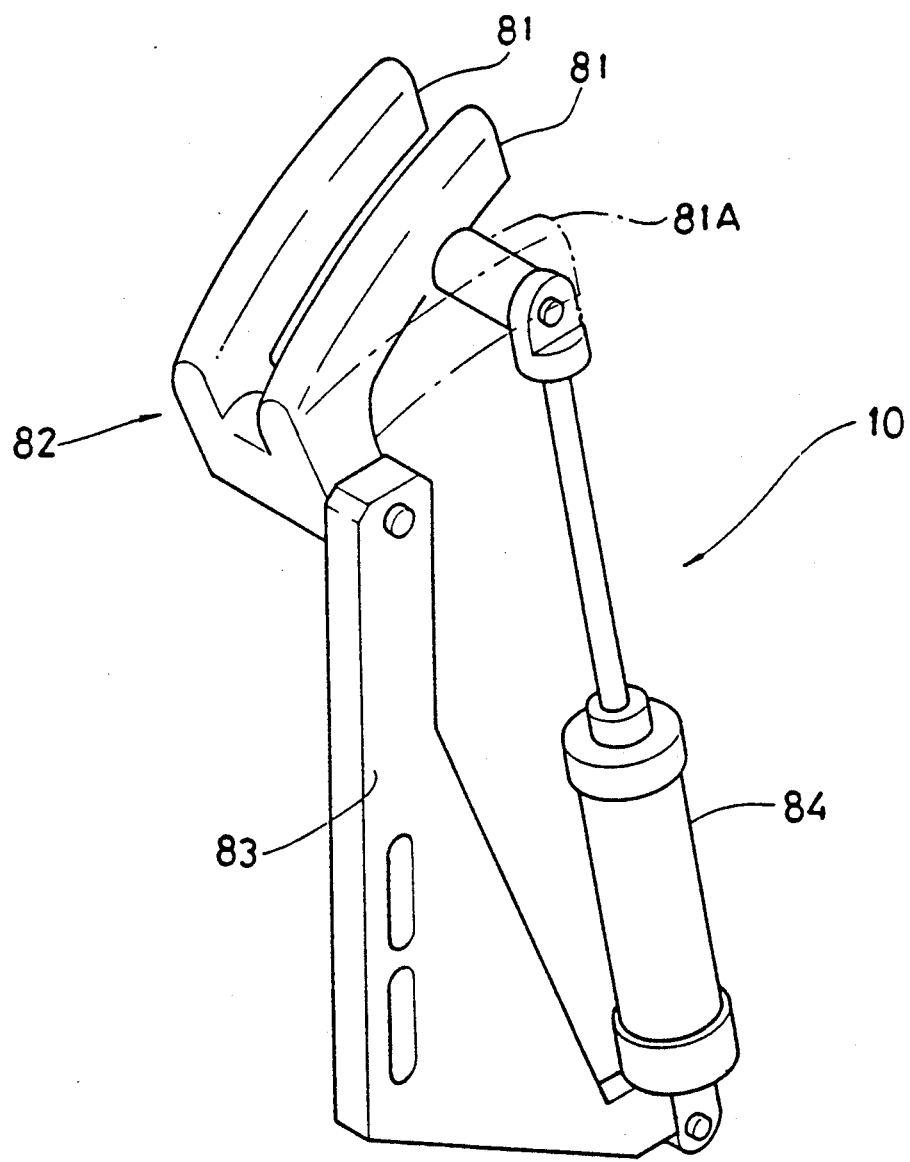
FIG. 7 is a perspective view showing an example of filler folding-up means.

The filler folding-up means 10 has, as shown in FIG. 7, a U-shaped folding-up tool 82 joining to a pair of folding-up pieces 81, 81 with an arc-shaped top, bent in an arc shape and spaced at a clearance in which the bead core A can be inserted, at their root part, and the root part is located on the side of first guide roller 21 pivoted in a supporting plate 83 and joined to a cylinder 84 at its tip. The supporting plate 83 is fixed to the frame by a bolt.

As a consequence, the filler folding-up means 10 can tilt the folding-up pieces 81 as shown in FIG. 13 together with the elongation and contraction of the cylinder 84 between the operating position to fold up the overhanging parts CA, CB outward in the radial direction of the bead apex and an escaping position 81A shown by a dot-and-dash line.

The filler press-fitting means 11 comprises a cone roller 74 and a disc multistage roller 76 as explained above.

Figure 8:
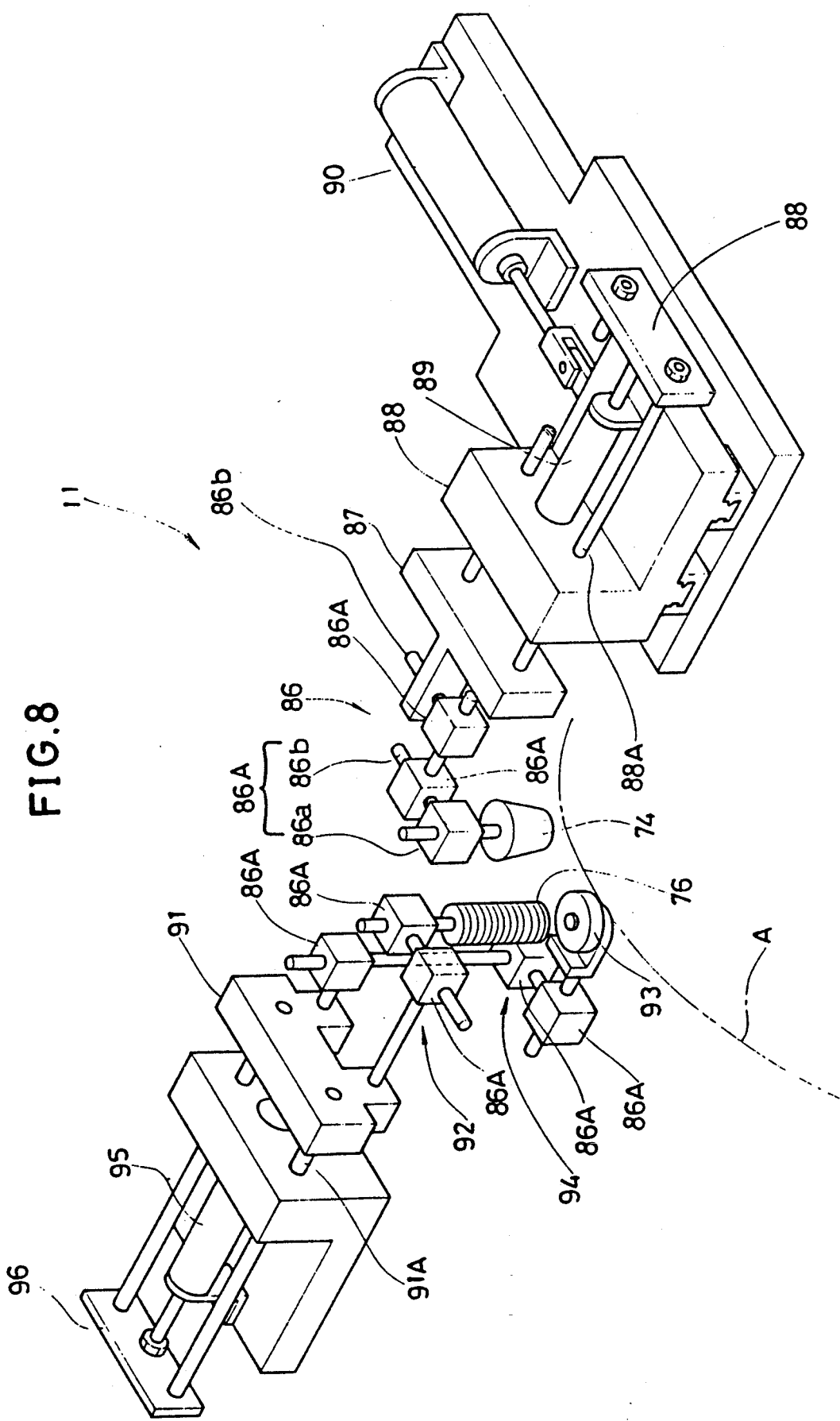
FIG. 8 is a perspective view showing an example of filler press-fitting means.

The cone roller 74 is, as shown in FIG. 8, mounted on the moving plate 87 through position adjusting means 86. The moving plate 87 is fixed to a guide shaft 88A extending from a transverse table 88 approximately perpendicularly to the plane A2, and a cylinder 89 on the transverse table 88 is joined to the guide shaft 88A through a joint plate 88B. The transverse table 88 can advance and withdraw on the rail approximately parallel to the plane because it is joined with a cylinder 90 on a base table mounted on the frame.

As a result, extension of the cylinder 89 and contraction of the cylinder 90 cause the cone roller 74 to move to an escaping position 74A shown by a dot-and-dash line in FIG. 1(a), and furthermore, extension of the cylinder 90 causes it to move inward in the radial direction, and then as shown in FIG. 14, the action of the cylinder 89 causes the cone roller to move to the action position (shown by a solid line in FIG. 1) where the bead filler C is securely press-fitted to the both side faces of the bead apex B and the bead core A in cooperation with the disc multistage roller 76. The position adjusting tool 86 is composed of three supporting fittings 86A 86A, 86A, each of which is formed by protruding a fitting shaft 86b at an end of a base part 86a and making a hole perpendicular to the fitting shaft 86b, and the position and the direction of the cone roller 74 attached to the top-end supporting fitting 86A can be adjusted by inserting a fitting shaft 86b of the adjacent supporting fitting 86A in the hole and fixing at approximate position and angle. In the supporting fitting 86A of the root side, its fitting shaft 86b is inserted and fixed perpendicularly to a protrusion projecting from the moving plate 87.

The disc multistage roller 76 is attached to the lower part of an edge of the moving plate 91 by a position-adjusting tool 92, and furthermore in this embodiment, a guide roller 93 contacting with the bead core A is mounted on the moving plate 91 by using a position-adjusting tool 94.

The moving plate 91 is mounted at an end of a guide shaft 91A passing the base table fixed to the frame, and the guide shaft 91A is linked to a cylinder 95 disposed approximately perpendicular to the plane A2 located on the base table through a coupling plate 96 at its rear end so that it could move between the operation position contacting with the bead apex B and a spaced escaping position 76A. The position-adjusting tools 92, 94 are formed by using supporting fittings 86A similar to those stated above.

The cone roller 94 having a shape along the side surface of the bead apex B is pivoted rotatably on the supporting fitting 86A, while the disc multistage roller 76 is a multistage stack-up body of thin discs such as ball bearings, which is supported in the same way rotatably on the top end supporting fitting 86A.

The operation of the apparatus of this invention is explained below.

At first, the second to fifth guide rollers 22 to 25 of the bead supporting means 2 are moved to the escaping positions 22A to 25A respectively. At the same time, the movable table 35 of the bead filler guide means 5, the receiving piece 18 of the bead filler joining means 7, the folding-up piece 81 of the filler folding-up means 10 and the cone roller 74 and the disc multistage roller 76 of the filler press-fitting means are brought to their escaping positions 35A, 18A, 81A, 74A and 76A respectively, and on the other hand, the supporting shaft 28 of the bead positioning means 12 is advanced. In this state, the application of the bead core A to the groove of the first guide roller 21 causes the lower end to be supported by the bead positioning means, and the bead core A to be inclined and held on the plane A2.

Sequentially when the second to fifth guide rollers 22 to 25 are returned to their operating positions, the bead core A is correctly supported in a complete circle. Then the supporting shafts 28 of the bead positioning means 12 are withdrawn to the escaping positions 28A.

The movable table 35 of the filler guide means 5 holds the starting edge CT of the preliminarily cut bead filler C at its escaping position 35A while preventing its slip-off by the holding means 52, and presses against the pressing part 43a by the blowing apparatus 41, and therefore the bead filler guide means 5 rises owing to the expansion of the cylinder 65 and adheres the starting edge CT of the bead filler C held by the pressing part 43a of the movable table 35, as shown in FIGS. 10(a), (b), at the position deflecting from the filler center CC by pushing against the internal circumferential surface AQ by adhesion (shown in FIG. 10(b)).

After its adhesion, the movable table 35 is brought back to its escaping position 35A.

The bead rotating means 6 rotates the bead core A by the first guide roller 21 and the second guide roller 22 owing to the drive of the rotating machine M. As soon as rotated, the bead filler C adheres to and is mounted on the internal circumferential surface AQ of the bead core A.

As explained above relating to FIG. 10(c), when the bead apex rotates by a rotating angle of ($\alpha$) and thus the length from the starting edge CT to a cutting portion of the bead filler C becomes equal to the sum of the length of the internal circumferential surface of the bead core plus that to form the overlapping portion J for joint, the bead rotating means 6 is arrested and the bead filler C is cut by the filler cutting means 4. The filler cutting means 4 cuts the bead filler C in the direction of the filler cords D by reciprocating the cutter 16 through the notch groove 45 by making use of the elongation of the cylinder 61. When cutting, as the pushing pieces 55, 56 are pushed down by the action of the cylinder 58 of the filler pressing means 40 so as to press and hold the bead filler C on the base plate 43, and at the same time, as the cutter is heated by the heater 62, the bead filler C is correctly cut.

After the cutting, the bead rotating means 6 is restarted, and the application of the remaining bead filler C on the internal circumferential surface AQ up to the terminating edge CE causes the bead filler C to be mounted cylindrically as shown in FIG. 10(e) and the overlapping portion j for joint to be formed, and when the knife-tip portion ET of the overlapping portion J coincides with the peak point a of the bead core A, that is, the guide roller 21, the bead rotating means 6 is stopped (FIG. 12).

Sequentially, the cylinder 70 of the filler joining means 7 is elongated to lower the receiving piece from the escaping position 18A and to make it abut against the upper surface of the knife-tip portion ET of the overlapping portion J, and simultaneously the turning piece 19 is turned by the cylinder 73, and hence the bead filler C is fixed and joined, as shown in FIGS. 11 and 12, at the knife-tip portion ET of the overlapping portion J (shown by a broken-line circle in FIGS. 3 and 12) by the adhesion between raw rubber sheets.

In the next, the restart of the bead rotating means 6 and the inclination of the folding-up piece 81 to the operating position as shown in FIG. 13 by the cylinder 84 of the filler folding-up means 10 cause the bead filler C to be folded up outward in the radial direction around the bead core with the apex.

In succession, the actions of cylinders 89, 90 and 95 of the bead filler press-fitting means 11 cause the bead filler C to be press-fitted to the both side faces of the bead apex B and the bead core A as shown in FIG. 14 by the cone roller 74 and disk multi-stage roller 76.

As explained above, since the overlapping portion J of the bead filler for joint is preliminarily joined, even when bending and folding up the bead filler C outward in the radial direction around the bead core A, the angle of the filler cords D is not deformed, and therefore it becomes possible to fold up the bead filler correctly while keeping the original cord angle.

Here, it is possible to form the apparatus 1 of this invention so as to join the overlapping portion J at its whole length by using the filler joining means 7.

In addition, its continuous and unattended operation is possible by automatically feeding the bead core A to the guide roller 21 and taking out the bead core A after finishing the bead filler applying process by using an appropriate closing and opening chuck.

It is furthermore preferably to apply a tack-free treatment on the surface of the members of the apparatus contacting with the bead filler C by using Teflon or the like.

As explained above, since the bead filler applying method and its apparatus of this invention are designed so as to mount the bead filler cylindrically on the internal circumferential surface of the bead core, and to fold up the bead filler outward in the radial direction after uniting or consolidating at least a part of overlapping portion for joint, the filler cord angles do not vary, and it hence becomes possible to enhance the quality of tire bead by preventing the formation of staggered joint and wrinkles.

We claim:

1. A belt-shaped flipper applying method comprising, in order, the steps of:

attaching a starting edge of a belt-shaped flipper onto an internal circumferential surface of an annular shaped bead core, said belt-shaped flipper being a longitudinal sheet formed by covering with rubber a plurality of parallel filler cords which are composed of organic fibers and disposed obliquely to the longitudinal direction of said sheet and being cut along said cords so as to provide a terminating edge, each of said starting edge and said terminating edge having a knife tip portion of which corner is an acute angle and an obtuse trianlge portion of which corner is an obtuse angle, said bead core having an apex mounted annularly on an outward surface of said bead core in the radial direction;

rotating said bead core to mount said flipper on said internal circumferential surface in an approximately cylindrical shape so as to form an overlapping portion with said starting edge and said terminating edge of said flipper;

joining and press-fitting mechanically at least one said knife-tip portion of one of said edges to at least one said obtuse triangle portion of the other of said edges extending beyond one of a pair of side faces of said bead core in said overlapping portion;

folding up said cylindrical flipper along each of said pair of side faces of said bead core and each of a pair of side faces of said apex by rotating said bead core; and press-fitting so as to unify said flipper with said bead core and apex.

* * * * *